(12) United States Patent
Burdeniuc

(10) Patent No.: US 6,379,562 B1
(45) Date of Patent: Apr. 30, 2002

(54) TREATMENT OF WATER CONTAINING ORGANIC WASTES WITH AROMATIC AMINE NITRATE SALTS

(75) Inventor: Juan Jesus Burdeniuc, Macungie, PA (US)

(73) Assignee: Atr Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/813,391

(22) Filed: Mar. 21, 2001

(51) Int. Cl.$^7$ .................................................. C02F 1/72
(52) U.S. Cl. ........................ 210/761; 210/903; 210/908
(58) Field of Search ............................... 210/761, 903, 210/908

(56) References Cited

U.S. PATENT DOCUMENTS

| | | |
|---|---|---|
| 4,654,149 A | 3/1987 | Harada et al. |
| 5,118,447 A | 6/1992 | Cox et al. |
| 5,221,486 A | 6/1993 | Fassbender |
| 5,641,413 A | 6/1997 | Momont et al. |

FOREIGN PATENT DOCUMENTS

| | | |
|---|---|---|
| GB | 1375259 | 11/1974 |
| JP | 6098297 | 11/1996 |

*Primary Examiner*—Betsey Morrison Hoey
(74) *Attorney, Agent, or Firm*—Russell L. Brewer

(57) ABSTRACT

A single step wet oxidation process for treating wastewaters containing organic species, with or without heteroatoms, and anions of strong acids, e.g. sulfate or phosphate ion, or cations of strong bases, e.g., sodium, potassium or calcium ions, and which may contain ammonium ion and/or nitrate ion in addition to added ammonium ion and/or nitrate ion was developed which on thermal treatment near the critical temperature of water removes substantially all the COD and nitrogen through conversion to water, carbon dioxide or carbonate species, nitrogen gas and small amounts of nitrous oxide. Key to the success of the process is the balancing of all reducing species with an equivalent amount of oxidizing species and the balancing of all strong acid anions with strong base cations and including at least 0.06 acetate ion for moles of nitrate in the wet oxidation process.

8 Claims, No Drawings

TREATMENT OF WATER CONTAINING ORGANIC WASTES WITH AROMATIC AMINE NITRATE SALTS

BACKGROUND OF THE INVENTION

Wet air oxidation is a well-known treatment process for the removal of COD and BOD from industrial and municipal wastewater streams. The processes involve contacting a wastewater stream with an oxidizing source, such as oxygen, ammonium nitrate and nitric acid at elevated temperatures and pressures to oxidize pollutants. Most carbonaceous material is converted to carbon dioxide. The nitrogen present either from organo-nitrogen compounds or other sources is converted to nitrogen gas.

The following references illustrate wet oxidation processes:

Proesmans, Luan and Buelow of Los Alamos National Laboratory (Ind. Eng. Chem. Res. 1997, 36 1559–1566) report on a high temperature and pressure (500° C./345 bar) hydrothermal oxidation process to remove organic compounds from a waste stream using ammonium nitrate as the oxidizing agent. In the oxidation of methanol and phenol, the authors report that unless an excess of oxidizable carbon is present, NOx in the effluent may become a problem. To avoid NOx production and reduce carbon components to carbon dioxide, a polishing step using hydrogen peroxide is suggested.

GB 1,375,259 discloses the wet oxidation of carbon and nitrogen containing materials to gaseous reaction products using HNO3 and/or a nitrate as oxidizing agent, at temperatures of between 150° C. and the critical temperature of water. The preferred oxidizing agent is $NH_4NO_3$, which disappears completely from the reaction medium. Example VII shows the treating of a waste stream of caprolactam, the sodium salt of aminocaproic acid and sodium sulfate with nitric acid at a temperature of 300° C. at 15 bars. The patentees report that slow heating of the reaction mixture resulted in reduced corrosiveness of the reactant mixture.

U.S. Pat. No. 4,654,149 discloses the use of a noble metal catalyst supported on a titania carrier in a wet oxidation process to decompose ammonium nitrate at 250° C. for 60 minutes. Approximately from 50–99% decomposition of both ammonium nitrate and nitrite is achieved without air present. Further examples show wet oxidation of phenol with 0.2 times the required amount of oxygen.

JP 60-98297, JP 61 257,292 and JP 61 257,291, discloses the catalytic wet oxidation of ammonium nitrate wastewaters with 1.0 to 1.5 times the stoichiometric oxygen required for ammonia decomposition, at a pH of 3–11.5 at a temperature from 100 to 370° C. with a supported noble metal catalyst.

U.S. Pat. No. 5,118,447 discloses a process for the thermochemical nitrate destruction where an aqueous solution of nitrate or nitrite is contacted with a stoichiometric amount of formic acid or formate salt, depending upon the pH. Wet oxidation is effected by heating to 200 to 600° C. in the liquid phase to form elemental nitrogen and carbon dioxide. The reaction may be carried out over a pH range of 0–14.

U.S. Pat. No. 5,221,486 discloses a denitrification process where the types of nitrogen compounds present in a waste stream are identified and quantified. The oxidized and reduced forms of nitrogen are balanced and, then, an appropriate nitrogen containing reactant, such as ammonia or a nitrite or nitrate compound, is added and the mixture is heated to 300 to 600° C. under pressure to effect denitrification.

U.S. Pat. No. 5,641,413 discloses the two stage wet oxidation of wastewater containing a carbonaceous and nitrogen species. In the first stage the COD is removed by wet oxidation at a temperature of less than 373° C. and a pressure sufficient to maintain a liquid water phase. The remaining nitrogen compounds are converted to nitrogen in the second stage by adding sufficient inorganic nitrogen-containing compound to the oxidized wastewater to produce essentially equal concentrations of ammonia-nitrogen, nitrite-nitrogen plus nitrate-nitrogen and a waste stream of reduced COD. Mineral acid is added to the oxidized wastewater to produce a pH between 4 and 7. Optionally, a transition metal salt is added, to catalyze a thermal denitrification step. The last step is conducted at 100° to 300° C. to decompose the nitrogen compounds.

D. Leavitt et al in Environmental Progress 9 (4), 222–228 (1990) and in Environ. Sci. Technol. 24 (4), 566–571 (1990) reported that 2,4-dichlorophenoxyacetic acid, atrazine and biphenyl were converted to $CO_2$ and other non-harmful gases ($N_2$ and $N_2O$) trough the homogeneous liquid phase oxidation with ammonium nitrate. These reactions were carried out by dissolving the substrates in polyphosphoric acid, adding ammonium nitrate and then heating to about 260° C. for some period of time. Although this clearly shows that ammonium nitrate is a good oxidizing agent, it is not a process lending itself to treating aqueous waste streams containing only 1,000 to 10,000 ppm TOC.

SUMMARY OF THE INVENTION

This invention relates to an improvement in a thermal process for the removal of organic carbon and organic or inorganic nitrogen-containing pollutants from wastewater streams using nitrate salts as the denitrifying agent. The improvement resides in using nitrate salts of aromatic amines (such as those present in the toluenediamine (TDA) waste water) as the main denitrifying source for the dinitrotoluene (DNT) wastewater. To reduce the corrosiveness of the treated effluents, the pH of the liquid is maintained in the range of 1.5 to 8 and preferably from 1.5 to 4 by adjustment with alkali metal.

This process can offer several advantages including:

an ability to work with an influent wastewater having a low pH (1.5 to 2.5) without causing significant corrosion;

an ability to eliminate organic carbon and organic or inorganic nitrogen-containing pollutants in a single step;

an ability to work under strong acidic conditions, e.g., high sulfate, and achieve excellent nitrate removal;

an ability to reduce nitrate and ammonia levels to drinking water standards when working under almost redox balanced conditions in a short period of time (20 minutes);

an ability to reduce nitrate and ammonia levels to drinking water standards when working under almost redox balanced conditions in a short period of time (20 minutes) and in the presence of a relatively high sulfate or phosphate concentrations; and, an ability to convert most of the organic carbon and organic or inorganic nitrogen-containing pollutants into carbon dioxide and nitrogen gas despite the fact that the operational $NH_4^+/NO_4^-$ is much smaller than that required by the stoichiometry (1.66).

DETAILED DESCRIPTION OF THE INVENTION

In our co-pending applications, Ser. No. 09/613,206 having a filing date of Jul. 10, 2000 and Ser. No. 09/659,055 having a filing date of Sep. 11, 2000, the subject mater of each being incorporated by reference, improvements for reducing the corrosiveness of waste streams contaminated with sulfur or phosphorous containing compounds, whether organic or inorganic, while maintaining reaction rate were proposed. The first application proposed: operating said process within a pH range from about 1.5 to 8 and preferably within a pH range of from about 1.5 to 4 by appropriate addition of alkali metal. The second application proposed adding organic material to the waste stream to provide acetate ion in a molar ratio from 0.06 to 0.17 moles per mole nitrate or, in the alternative, should the waste stream contain organic material convertible to acetate in the wet oxidation process, maintain a level of organic material sufficient to provide acetate ion in an amount of at least 0.06 moles per mole of nitrate. The addition, or maintenance of organic material convertible to acetate ion acts as a corrosion inhibitor or buffer assisting in reducing corrosion at pH values of 4 and lower.

However, in the above processes the presence of strong acid anions, nitrate ion removal by ammonium ion becomes more difficult because these acids inhibit the denitrification process. Thus, if a high percent nitrate removal is desired (as expected for effluents that are going to be discharged into the environment), then excess reducing agent or longer reaction times may be required. These two alternatives, i.e., addition of alkali and longer reaction times have some disadvantages, i.e., it may require more than one step or require the use of larger reactors.

This improvement to the above processes uses nitrate salts of aliphatic and aromatic amines to remove nitrate from waste streams and to reduce total organic content (TOC). Thus, denitrification and TOC removal can be accomplished in a single step.

Thus, nitrate and nitrite, including TOC, can be removed from a waste stream by thermal treatment with salts of aliphatic and aromatic amines such as toluene-diammonium nitrate salts or the aniline nitrate salts. The use of aromatic or aliphatic amines has the advantage that they can act as better denitrifying agents than ammonia when used in the presence of sulfate or phosphate. The toluene-diammonium nitrate salts are shown;

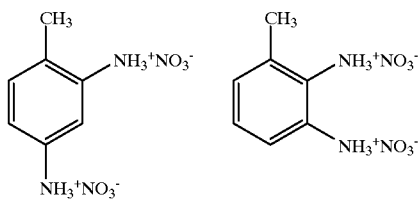

During the process, the nitrate salts of aromatic amines, such as, TDA salts will decompose to give mainly carbon dioxide and nitrogen gas according to the following chemical equation:

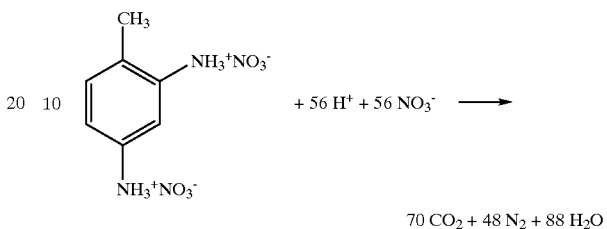

$$70\, CO_2 + 48\, N_2 + 88\, H_2O$$

Thus, to achieve removal of carbonaceous and nitrogenous compounds to a desirable level the oxidation and reduction properties of all oxidizable and reducible species present in the wastewater stream are balanced. Because some of the oxidizable species may decompose to gaseous products (i.e. methane, ethylene, etc) that do not participate in the nitrate removal process, balancing the waste stream does not necessarily means stoichiometric balance of the influent wastewater but rather a small excess of reducing agent may be needed as shown in some of the illustrative examples.

Examples of nitrate salts of aliphatic amines and aromatic amines in addition to those mentioned include C1–4 alkyl amines, e.g., methyl amine, ethyl amine, butyl amine; cycloaliphatic amines such as cyclohexane diamine, cyclohexylamine, methylcyclohexyl amine and methylcyclohexyldiamine.

As shown in the above chemical equation, the degradation of nitrate to nitrogen gas by the nitrate salt of TDA requires that acid be consumed acid during the process. Therefore, as the reaction progresses, addition of acid to the reaction media may be necessary to ensure acceptable reaction rates.

Methods for the treatment of wastewater streams containing nitrate, nitrite, sulfate and organic pollutants with ammonia have been previously described. In these processes, ammonium ion (i.e., from ammonium sulfate) acts as the major reducing agent reacting with nitrate (or nitrite) ion to form mainly nitrogen. Organic carbon, typically present in small amounts, would be almost fully oxidized to carbon dioxide during the process.

In a continuous process, a convenient way to provide acidity for this process is by adding some minor amounts of ammonium sulfate (2.2 g/l to 4.7 g/l) to produce acidity as shown in the equation below:

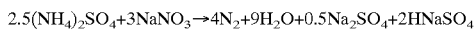

Another alternative is to provide the acidity by feeding the reactor with sulfuric acid as in a semi-batch process.

Because maximum nitrate removal requires working under strong acidic conditions, corrosion of the metal container will occur. However, there are two contributing factors that prevent the corrosion of the stainless steel reactor. One of them consists on balancing or partially balancing anions from strong acids with alkali or alkali earth metal cations. The other comes from the corrosion inhibition effect provided by some organic by-products generated during the oxidative degradation of the organic reducing agents. These features are shown in the prior mentioned copending applications. In particular, nitrate salts of toluenediamines decompose with the formation of acetic acid that acts as a corrosion inhibitor allowing us some flexibility when optimizing the $M^+/SO_4^{2-}$ ratios.

The first step in accomplishing removal of carbonaceous and nitrogenous components to a desirable level requires balancing the oxidation and reduction properties of all of the oxidizable and reducible species present in the wastewater stream. All nitrogen containing species, organic or inorganic, produce substantially only nitrogen and minor amounts of nitrous oxide gas and all carbon containing species produce substantially only carbon dioxide.

One key to pH control in the first step, and to the maintaining of reaction rate during wet oxidation of wastewater streams contaminated with sulfur or phosphorus substances and alkali and alkaline earth metals (designated M), is in the control of the $M/SO4^{-2}$ and $M/PO4^{-3}$ ratio (equivalence basis). This is accomplished as follows: contaminants whose anions are of strong acids, e.g., sulfate and phosphates are balanced with alkali or alkaline earth metal cations and conversely, cations of strong bases are balanced with sulfate or phosphate. The ratio of $M/SO4^{-2}$ is maintained from 0.1 to 4, preferably 0.2 to 1, most preferably from 0.4 to 0.7 and the ratio of $M/PO4^{-3}$ of from 0.1 to 2, preferably 0.2 to 0.67 during wet oxidation. Lower ratios, <0.4 for $M/SO4^{-2}$ may be tolerated when the process effluent designed permits operation with some residual carbon compounds in the effluent. High ratios reduce reaction rate.

The second step in the process involves the balancing of organic species such that on substantial reduction of nitrogen in the wet oxidation process there remains sufficient carbonaceous material in solution under the process conditions in the form of e.g., a) acetic acid and/or its derivatives such as esters, amides, salts, etc; or b) carbonaceous compounds that upon oxidation are precursors to acetic acid or its derivatives. Typically, the molar ratio of acetate to nitrate is kept from falling below 0.06:1.

Pressures are controlled to a high enough pressure to maintain a liquid phase behavior for both the influent and the effluent. If gas phase conditions occur, the salts in the wastewater oxidation product may precipitate and cause plugging of the reactor.

The following examples are provided to illustrate various embodiments and provide rules for guidance to balance the reduction and oxidation half reactions and are not intended to restrict the scope thereof.

EXAMPLE 1

Effect of Aromatic Nitrate in TDA Waste Stream

In this example essentially complete nitrate removal is accomplished in a relatively short time (continuous process, residence time=30 minutes) when using aromatic amines from toluenediamine (TDA) waste water formed by the slurry phase catalytic hydrogenation of dinitrotoluene as the main reducing agent. Remarkably, ammonia was also completely removed from the wastewater with a significant total; organic carbon (TOC) reduction. More specifically, the process conditions were as follows:

A dinitrotoluene wastewater formed by the mixed acid nitration of toluene (DNT) sample W5 was prepared by mixing the following wastewater streams: 1340 g W1, 410 g W2, 1540 G W3 and 715 g W4.

| DNT Wastewaters (ppm) | | | | | | | | | | |
|---|---|---|---|---|---|---|---|---|---|---|
| Waste | Nitrite | Nitrate | Sulfate | Oxalate | $NH_3$ | PH | Na | 2,4-DNBA | TNOC | DNT's |
| W1 | 1,219 | 9,363 | 417 | ND | 0 | ND | 0 | ND | — | ND |
| W2 | 199 | 431 | 6,143 | 99 | 3,184 | 9.2 | 0 | 132 | 357 | 4,192 |
| W3 | 0 | 0 | 9,928 | ND | 0 | ND | 0 | ND | — | ND |
| W4 | 0 | 14,790 | 38,305 | ND | 0 | ND | 0 | ND | — | ND |

| TDA Wastewater (g) | | | | |
|---|---|---|---|---|
| Waste | Water | TDA | Toluidine | Aniline |
| W6 | 1000 g | 1.80 g | 1.75 g | 0.26 g |

TDA wastewater (W6) (345 g) was mixed with dinitrotoluene (DNT) wastewater W5 (1155 g) to give an acidic (pH=1.43) orange solution. The solution was adjusted with ammonia (16.93 g, 5.0 N solution), sodium nitrate (1.73 g, 0.02 mole) and sodium hydroxide (27.2 g, 5.0 N solution) to give a solution with a pH=1.65.

The combined DNT/TDA wastewater was analyzed showing the following composition:

| Wastewater (ppm) | | | | | | |
|---|---|---|---|---|---|---|
| Acetate | Nitrate | Ammonia | Sulfate | Sodium | TOC | pH |
| 0 | 5,314 | 1,212 | 8,234 | 2,296 | 782 | 1.65 |

This sample was thermally treated for 30 minutes to give a clear effluent with the following composition:

| Effluent (ppm) | | | | | | |
|---|---|---|---|---|---|---|
| Acetate | Nitrate | Ammonia | Sulfate | Sodium | TOC | pH |
| 174 | 0 | 0 | 8,234 | 2,296 | 122 | 2.0 |

The potential for nitrate removal in the combined DNT/TDA wastewater has the following distribution:

| | | |
|---|---|---|
| Potential nitrate removal from ammonia | 2,652 ppm nitrate | 50% |
| Potential nitrate removal from organics | ~3,720 ppm nitrate | 70% |
| Total potential nitrate removal | 6,372 ppm nitrate | 120% |

The % potential nitrate removals were calculated based on the full conversion of organic-carbon to carbon dioxide and organic/inorganic nitrogen to nitrogen gas.

Other parameters:

| Other Parameters | | | |
|---|---|---|---|
| $Na/SO_4^{-2}$ ratio | $NH_4/NO_3$ ratio | Residence time (min) | Temperature (° C.) |
| 0.55 | 0.83 | 30 | 370 |

| Effluent Heavy Metals (ppm) | | | |
|---|---|---|---|
| Iron | Chromium | Nickel | Molybdenum |
| 4.13 | 0.14 | 1.14 | 0.47 |

EXAMPLE 2

Effect of Residence Time on Nitrate Reduction

This example is essentially the same as Example 1, but the thermal treatment was carried out for a shorter period of time. Surprisingly, all nitrate and ammonia were removed from the wastewater in only 20 minutes with the total organic content (TOC) being significantly reduced.

The composition of the wastewater is shown below:

| Wastewater (ppm) | | | | | | |
|---|---|---|---|---|---|---|
| Acetate | Nitrate | Ammonia | Sulfate | Sodium | TOC | pH |
| 0 | 5359 | 1,211 | 8,127 | 2,485 | 796 | 1.75 |

This sample was thermally treated for 20 minutes to give a clear effluent with the following composition:

| Effluent (ppm) | | | | | | |
|---|---|---|---|---|---|---|
| Acetate | Nitrate | Ammonia | Sulfate | Sodium | TOC | pH |
| 217 | 0 | 0 | 8,234 | 2,573 | 118 | 2.0 |

The potential for nitrate removal in the combined DNT/TDA wastewater has the following distribution:

| | | |
|---|---|---|
| Potential nitrate removal from ammonia | 2,652 ppm nitrate | 50% |
| Potential nitrate removal from organics | ~3,720 ppm nitrate | 70% |
| Total potential nitrate removal | 6,372 ppm nitrate | 120% |

The % potential nitrate removals were calculated based on the full conversion of organic-carbon to carbon dioxide and organic/inorganic nitrogen to nitrogen gas.

Other parameters:

| Other Parameters | | | |
|---|---|---|---|
| $Na/SO_4^{-2}$ ratio | $NH_4/NO_3$ ratio | Residence time (min) | Temperature (° C.) |
| 0.63 | 0.82 | 20 | 370 |

| Effluent Heavy Metals (ppm) | | | |
|---|---|---|---|
| Iron | Chromium | Nickel | Molybdenum |
| 4.13 | 0.14 | 1.14 | 0.47 |

EXAMPLE 3

Effect of Thermal Treatment on Effluent Gas Composition

Flame incineration of aromatic amines is known to produce nitrogen oxides that are harmful to the environment. Therefore, the purpose of this process was to examine the composition of the gas evolving during the thermal treatment and found no $NO_x$.

The gas evolving during the process was collected in a 500 ml stainless steel cylinder and pressurized with helium. The sample was analyzed by Gas Chromatography and compared with calibration standards showing the following composition:

| Component | Mole % |
|---|---|
| Carbon Dioxide | 12.14% |
| Nitrous Oxide | 0.54% |
| Oxygen/Argon | N.D. |
| Nitrogen | 19.40% |
| Methane | 0.05% |
| Carbon Monoxide | N.D. |
| Ethane | <1 ppm |

-continued

| Component | Mole % |
|---|---|
| Ethylene | 95 ppm |
| Propane | N.D. |
| Propylene | 19 ppm |
| Isobutane | <1 ppm |
| n-Butane | 1 ppm |
| t-2-Butene | 4 ppm |
| 1-Butene | 7 ppm |
| Isobutylene | 13 ppm |
| c-2-Butene | 3 ppm |
| Isopentane | 7 ppm |

Note: N.D.=Not Detected. The lower limit of detection for $O_2$/Ar and CO is approximately 60 mole ppm.

Note: The samples were analyzed for C1–C6 hydrocarbons. The data above is the average of two determinations. The lower limit of detection for each hydrocarbon is approximately 1 mole ppm.

EXAMPLE 4

Comparison of Organic Reducing Agents to Nitrate Salts of Aromatic Amines

In this example organic reducing agents other than amines (i.e., dinitrobenzoic acid (DNBA), dinitrocresols (DNOC) or acetic acid), were used as the reducing agent.

The following samples of synthetic wastewater were prepared according to the following procedures:

Feed for Run 1: ammonium nitrate (40.0 g, 0.5 mole) was dissolved together with ammonium sulfate (7.25 g, 54.9 mmole) and sodium acetate trihydrate (8.04 g, 61 mmole) in 3000 ml of water. To this solution, ammonium hydroxide (5 N solution in water) (26.5 ml, 0.132 mole), sodium hydroxide (5.0 N) (20 ml, 0.1 mole), sulfuric acid (12 N solution) (32.2 ml, 0.1932 mole), dinitrobenzoic acid (7.25 g, 34.2 mmole) and dinitrocresol (0.37 g, 1.86 mmole) were added to give a deep yellow solution with a pH of 1.8.

Feed for Run 2: ammonium nitrate (40.09 g, 0.5 mole) was dissolved together with ammonium sulfate (7.3 g, 55.3 mmole) and sodium acetate trihydrate (5.07 g, 38.4 mmole) in 2952 ml of water. To this solution, ammonium hydroxide (5 N solution in water) (28.2 ml, 0.141 mole), sodium hydroxide (5.0 N) (20 ml, 0.1 mole), sulfuric acid (44%) (41.4 g, 0.18 mole), sodium sulfate (7.71 g, 58.4 mmole), dinitrobenzoic acid (7.20 g, 33.9 mmole) and dinitrocresol (0.34 g, 1.7 mmole) were added to give a deep yellow solution with a pH of 1.9.

Feed for Run 3: same synthetic water as run 1 but thermally treated for 30 minutes (residence time=30 minutes).

Feed for Run 4: ammonium nitrate (40.68 g, 0.5 mole) was dissolved together with ammonium sulfate (7.78 g, 59.0 mmole) and sodium acetate trihydrate (4.06 g, 30 mmole) in 2970 ml of water. To this solution, ammonium hydroxide (5 N solution in water) (24.6 ml, 0.123 mole), sodium hydroxide (5.0 N) (20 ml, 0.1 mole), sulfuric acid (44%) (23.6 g, 0.1 mole), dinitrobenzoic acid (7.10 g, 33.5 mmole) and dinitrocresol (0.38 g, 1.9 mmole) were added to give a deep yellow solution with a pH of 1.9.

Feed for Run 5: same synthetic water as run 4 but thermally treated for 30 minutes (residence time=30 minutes).

The synthetic wastewaters were analyzed for organic and inorganic components:

| | Wastewaters (ppm) | | | | | | | | |
|---|---|---|---|---|---|---|---|---|---|
| Feed | Nitrate | Ammonia | Sulfate | Na | DNBA | DNOC | Acetate | TOC | COD |
| 1 | 9,676 | 3,900 | 7,810 | 1,124 | 1,844 | 102 | 1,403 | 1,694 | 3,800 |
| 2 | 9635 | 4,665 | 8,527 | 1,839 | 1,855 | 103 | 939 | 1,520 | 3,425 |
| 3 | 9676 | 3,900 | 7,810 | 1,124 | 1,844 | 102 | 1,403 | 1,694 | 3,800 |
| 4 | 10,160 | 4,489 | 6,330 | 884 | 1,920 | 104 | 636 | 1433 | 3,075 |
| 5 | 10,160 | 4,489 | 6,330 | 884 | 1,920 | 104 | 636 | 1433 | 3,075 |

An excess reducing agent is present in all the synthetic feeds with the purpose of maximizing nitrate removal. The potential nitrate removal from ammonia and organic waste can be seen in the following table:

| Feed # | % Pot. $NO_3$ removal organic | % Pot. $NO_3$ removal $NH_3$ | % Total |
|---|---|---|---|
| 1 | 47.6 | 88.4 | 136 |
| 2 | 40.4 | 106.0 | 146 |
| 3 | 48.0 | 88.0 | 136 |
| 4 | 96.7 | 31.5 | 128 |
| 5 | 96.7 | 31.5 | 128 |

Samples were thermally treated using the wet oxidation process to give effluents with the following compositions:

| | | | Effluents (ppm) | | | | | |
|---|---|---|---|---|---|---|---|---|
| Feed # | Nitrate | Ammonia | Sulfate | Sodium | DNBA | DNOC | Acetate | TOC | COD |
| 1 | 294 | 1,490 | 7,810 | 1,124 | 0 | 0 | 288 | 188 | 464 |
| 2 | 985 | 2,057 | 8,257 | 1,839 | 0 | 0 | 146 | 112 | 284 |
| 3 | 110 | 1,743 | 7,810 | 1,124 | 0 | 0 | 257 | 150 | 330 |
| 4 | 630 | 1,266 | 6,330 | 884 | 0 | 0 | 42 | 57 | 169 |
| 5 | 215 | 1,611 | 6,330 | 884 | 0 | 0 | 0 | 27 | 62 |

Some of the reaction parameters for every individual run can be seen in the following table:

| Feed # | Na/SO$_4$ | NH$_4$/NO$_3$ | RT (min) | Temp. (° C.) | Influent pH | Effluent pH |
|---|---|---|---|---|---|---|
| 1 | 0.30 | 1.46 | 20 | 370 | 1.8 | 2.2 |
| 2 | 0.45 | 1.76 | 20 | 370 | 1.9 | 2.1 |
| 3 | 0.30 | 1.46 | 30 | 370 | 1.8 | 2.2 |
| 4 | 0.29 | 1.6 | 20 | 370 | 1.9 | 2.3 |
| 5 | 0.29 | 1.6 | 30 | 370 | 1.9 | 2.3 |

The effluents were also analyzed for iron, chromium, nickel and molybdenum to the extend of corrosion in every individual run:

| | Effluents Heavy Metals (ppm) | | | |
|---|---|---|---|---|
| Feed # | Fe | Cr | Ni | Mo |
| 1 | 1.06 | <0.07 | 0.89 | <0.30 |
| 2 | 0.31 | <0.07 | 1.0 | <0.17 |
| 3 | 3.68 | <0.05 | 1.0 | <0.17 |
| 4 | <0.12 | 0.1 | 0.90 | <0.17 |
| 5 | <0.12 | 0.23 | 0.85 | <0.17 |

A large excess of reducing agent is necessary to remove most of the nitrate (i.e., run 3). In consequence, the effluent contains a high concentration of ammonia and/or TOC. Thus, discharge of these effluents to the environment requires further treatment to lower the levels of ammonia or TOC requiring an extra step.

Notice that a "nitrogen containing organic" is not a sufficient condition for the effectiveness of the process since the organic reducing agents used in these examples are "nitrogen containing" but they are ineffective as shown in runs using feeds 4 and 5 where most of the reducing agent is provided by the organics.

Examples 1, 2 and 3 showed that although the nitrate levels were significantly reduced, no complete nitrate removal was accomplished even though large excess of ammonia (potential nitrate removal from ammonia $\geq 88\%$) was used. Thus ammonia itself is an ineffective reducing agent at these relatively high sulfate concentrations (~6, 000–8,000 ppm). Moreover, excess ammonia remains in the effluent requiring further treatment. Also, addition of acetic acid was necessary to prevent excessive corrosion of the stainless steel reactor.

EXAMPLE 5

Effect of Ammonia & Nitric Acid on TDA Wastewater

In these examples the mixtures of TDA wastewater/ammonia/nitric acid were modified to provide optimum condition for nitrate removal in a continuous process.

A sample of synthetic wastewater (W1) was prepared by dissolving 2,4-toluenediamine (2.15 g, 17.6 mmole), 2,4-dinitrotoluene (0.34 g, 1.87 mmole), aniline (0.31 g, 3.33 mmole) and p-toluidine (2.14 g, 20 mmole) in 3000 ml of water.

Another solution of synthetic (W2) wastewater was prepared by dissolving sodium nitrate (45.3 g, 0.53 mole), 2,4-DNBA (6.511 g, 30.7 mmole), H$_2$SO$_4$ (69.5 g, 12 N, 0.31 mole), ammonium hydroxide (35.2 ml, 5 N, 0.18 mole) and NaAcO.3H$_2$O (1.35 g, 9.92 mmole) in 3000 ml of water.

Feed for Run 1: a 750 ml sample of W1 was mixed with an equal volume of W2 to give an acidic (pH=1.6) and deeply colored solution (purple). The combined waste water was pH adjusted with 13.5 g of sodium hydroxide 5.0 N to give a solution with a pH=1.9.

Feed for Run 2: a 750 ml sample of W1 was mixed with an equal volume of W2 to give an acidic (pH=1.6) and deeply colored solution (purple). Ammonium hydroxide (4.33 g, 5.0 N solution) and sodium hydroxide (4.0 g, 5.0 N solution) were added to the combined waste to give a solution with a pH=1.9.

Feed for Run 3: a 750 ml sample of W1 was mixed with an equal volume of W2 to give an acidic (pH=1.6) and deeply colored solution (purple). Ammonium hydroxide (8.5 g, 5.0 N solution was added to the combined waste to give a solution with a pH=1.9.

Analysis of this wastewater gave the following concentrations:

| | | | Wastewater (ppm) | | | | | |
|---|---|---|---|---|---|---|---|---|
| Run # | Acetate | Nitrate | Ammonia | Sulfate | Sodium | TOC | COD | pH |
| 1 | 139 | 4,983 | 502 | 4,663 | 2,700 | 932 | 2,914 | 1.9 |
| 2 | 139 | 5,163 | 681 | 4,798 | 2,840 | 932 | 2,930 | 1.9 |
| 3 | 158 | 5,136 | 930 | 4,873 | 2,043 | 978 | 2,858 | 1.9 |

The samples were thermally treated for 30 minutes to give a clear effluent with the following composition:

| | | | Effluent (ppm) | | | | | |
|---|---|---|---|---|---|---|---|---|
| Run # | Acetate | Nitrate | Ammonia | Sulfate | Sodium | TOC | COD | pH |
| 1 | 308 | 1,132 | 152 | 4,813 | 2,496 | 350 | 976 | 7.0 |
| 2 | 292 | 357 | 72 | 4,798 | 2,840 | 238 | 654 | 6.3 |
| 3 | 235 | 280 | 120 | 4,873 | 2,043 | 306 | 740 | 2.3 |

The potential for nitrate removal for these feeds were as follows:

| Run # | % Pot. $NO_3$ removal organic | % Pot. $NO_3$ removal $NH_3$ | % Total |
|---|---|---|---|
| 1 | 97 | 22 | 119 |
| 2 | 97 | 29 | 126 |
| 3 | 97 | 39 | 136 |

Other parameters:

| Run # | $Na/SO_4^{-2}$ ratio | $NH_4/NO_3$ ratio | Residence time (min) | Temperature (° C.) |
|---|---|---|---|---|
| 1 | 1.2 | 0.36 | 30 | 370 |
| 2 | 1.23 | 0.48 | 30 | 370 |
| 3 | 0.87 | 0.66 | 30 | 370 |

| | Effluent Heavy Metals (ppm) | | | |
|---|---|---|---|---|
| Run # | Iron | Chromium | Nickel | Molybdenum |
| 1 | <0.17 | <0.05 | <0.15 | <0.67 |
| 2 | <0.17 | <0.05 | <0.15 | <0.67 |
| 3 | <0.17 | <0.05 | <0.15 | <0.67 |

From the above, increasing the concentration of ammonia as shown from runs 1 to 3 causes an increase in the nitrate removal. Noteworthy, a change in the concentration of ammonia from 502 ppm (run 1) to 681 ppm (run 2) caused a jump in the % nitrate removal from 77% to 93%. The data also shows that too much ammonia can be detrimental to the TOC content in the effluent as shown in run 3.

EXAMPLE 6

Effect on Sulfate Ion Using Ammonium Nitrate or Toluenediammonium Nitrate

Denitrifying Agent OTD.

Run 1: A synthetic wastewater (WW) feed was prepared by dissolving OTD (ortho-toluenediamine) (1.025 g, 8.4 mmole), ammonium nitrate (2.14 g, 26.75 mmole), sodium nitrate (4.56 g, 53.6 mmole), ammonium hydroxide (3.39 g of 5 N solution), sodium hydroxide (16 g, 5 N solution) and sulfuric acid (12.75 g, 12 N solution, 57.2 mmole) in 1000 ml of water.

Run 2: The feed was prepared by addition of sodium sulfate (1.0 g, 7.04 mmole) to the synthetic feed of run 1.

Run 3: The feed was prepared by addition of sodium sulfate (2.0 g, 14.08 mmole) to the synthetic feed of run 1.

denitrifying Agent $NH_3$.

Run 4: A synthetic feed was prepared by dissolving ammonium nitrate (6.45 g, 80.62 mmole), sodium acetate (1.38 g, 10.14 mmole), ammonium hydroxide (8.5 g of 5 N solution), sodium hydroxide (16.6 g, 5 N solution) and sulfuric acid (12.75 g, 12 N solution, 57.2 mmole) in 1000 ml of water.

Run 5: The feed was prepared by addition of sodium sulfate (1.0 g, 7.04 mmole) to the synthetic feed of run 4.

Run 6: The feed was prepared by addition of sodium sulfate (2.0 g, 14.08 mmole) to the synthetic feed of run 4.

Analysis.

Denitrifying agent OTD.

| Run # | % Pot. NO$_3$ removal OTD | % Pot. NO$_3$ removal NH$_3$ | % Total | Analysis of the synthetic feeds Nitrate | Ammonia | Sulfate |
|---|---|---|---|---|---|---|
| 1 | 75 | 25 | 100 | 4,834 | 656 | 5,284 |
| 2 | 75 | 25 | 100 | 4,834 | 656 | 6,415 |
| 3 | 75 | 25 | 100 | 4,834 | 656 | 6,800 |

The synthetic feeds were thermally treated for 20 minutes and the effluents were analyzed.

Analysis of the effluents

| Run # | Nitrate | Ammonia | Sulfate |
|---|---|---|---|
| 1 | 265 | 0 | 5,284 |
| 2 | 522 | 0 | 6,415 |
| 3 | 641 | 18 | 6,800 |

Thus, the % nitrate removal changed according to the sulfate concentration as shown below:

| Run # | Sulfate | % Nitrate Removal | % Change in NR |
|---|---|---|---|
| 1 | 5,284 | 94.3 | 0.0 |
| 2 | 6,415 | 90.0 | 4.3 |
| 3 | 6,800 | 86.6 | 7.7 |

Therefore, increasing the sulfate concentration from 5284 ppm to 6800 ppm caused a 7.7% change in the nitrate removal.

Analysis.

Denitrifying agent NH$_3$.

| Run # | % Pot. NO$_3$ removal Acetate | % Pot. NO$_3$ removal NH$_3$ | % Total | Analysis of the synthetic feeds Nitrate | Ammonia | Sulfate |
|---|---|---|---|---|---|---|
| 4 | 60 | 90 | 150 | 4,692 | 2,236 | 5,264 |
| 5 | 60 | 90 | 150 | 4,692 | 2,236 | 6,061 |
| 6 | 60 | 90 | 150 | 4,692 | 2,236 | 6,612 |

The synthetic feeds were thermally treated for 20 minutes and the effluents were analyzed.

Analysis of the effluents

| Run # | Nitrate | Ammonia | Sulfate |
|---|---|---|---|
| 4 | 1,180 | 1,047 | 5,264 |
| 5 | 1,691 | 1,047 | 6,061 |
| 6 | 2,492 | 1,047 | 6,612 |

Thus, the % nitrate removal changed according to the sulfate concentration as shown below:

| Run # | Sulfate | % Nitrate Removal | % Change in NR |
|---|---|---|---|
| 4 | 5,264 | 74.5 | 0.0 |
| 5 | 6,061 | 63.5 | 11 |
| 6 | 6,612 | 46.8 | 28 |

The data can be summarized in the next diagram:

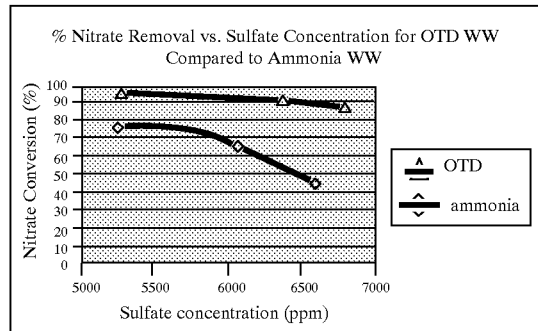

Examination of the data shows the inhibition on denitrification caused by the presence of sulfate ion. From the above data, and as reflected in the graph, increasing the sulfate concentration from 5,264 ppm to 6,612 ppm caused a 28% change in the nitrate removal. A comparison between runs 4 and 1 shows that OTD is a better agent for nitrate removal because under similar conditions OTD removed 94.3% of the nitrate while ammonia only 74.5%. In addition, a comparable increase in the sulfate concentration (going up 1348 ppm for the ammonia case and 1516 ppm for the OTD case) caused a remarkably decrease in the % nitrate removal for the ammonia case with a 28% reduction in the nitrate removal but it had little effect when OTD was used as the main denitrifying reagents causing only a 7.7% reduction.

EXAMPLE 7

Effect of Aniline as Denitrifying Agent

This example shows that good nitrate removal can be accomplished when aniline (or anilinium salts) are used as the main denitrifying agent.

A synthetic sample of aniline wastewater was prepared by dissolving aniline (1.33 g, 14.3 mmole), sulfuric acid (8.0 g, 12 N solution), ammonia (5.90 g, 5.02 N solution), acetic acid (0.7 g, 11.6 mmole) and sodium nitrate (7.65 g, 90 mmole) in 1000 ml of water. The solution was analyzed as shown below:

| Nitrate | Ammonia | Acetate | Sulfate | Sodium | pH |
|---|---|---|---|---|---|
| 5600 | 464 | 676 | 3800 | 2230 | 2.0 |

Concentrations are in ppm units.

The wastewater sample was then treated for 20 minutes at 370° C. to give a pale yellow effluent with the following composition:

| Nitrate | Ammonia | Acetate | Sulfate | Sodium | pH |
|---|---|---|---|---|---|
| 300 | 110 | 610 | 3800 | 2230 | 6.8 |

Concentrations are in ppm units.

Therefore, good nitrate removal (95%) can be accomplished using aniline as main denitrifying agent.

This example shows that no appreciable corrosion occurred in the presence of added acetate ion corrosion inhibitor as evidenced by the low concentration of transition metals present in the effluent.

EXAMPLE 8

Effect of Aniline in The Absence of Acetic Acid

In this example, aniline was used as the main denitrifying agent in the absence of added acetic acid (the corrosion inhibitor).

A synthetic sample of aniline wastewater was prepared by dissolving aniline (1.33 g, 14.3 mmole), sulfuric acid (7.60 g, 12 N solution), ammonia (5.91 g, 5.02 N solution) and sodium nitrate (7.65 g, 90 mmole) in 1000 ml of water. The solution was analyzed as shown below:

| Nitrate | Ammonia | Acetate | Sulfate | Sodium | pH |
|---|---|---|---|---|---|
| 5471 | 413 | 0 | 3321 | 2000 | 2.0 |

Concentrations are in ppm units.

The wastewater sample was then treated for 20 minutes at 370° C. to give a pale yellow effluent with the following composition:

| Nitrate | Ammonia | Acetate | Sulfate | Sodium | pH |
|---|---|---|---|---|---|
| 600 | 140 | ~150 | 3321 | 2000 | 7.1 |

Concentrations are in ppm units.

Therefore, a good nitrate removal (90%) can be accomplished using aniline as main denitrifying agent.

The effluent was analyzed for iron, chromium, nickel and molybdenum. The results showed that no appreciable corrosion occurred even though no acetate was added to the wastewater. The data is shown below:

| Fe | Cr | Ni | Mo |
|---|---|---|---|
| <0.3 | <0.1 | <0.2 | 3.05 |

Concentrations are in ppm units.

The results showed that excellent % nitrate removal was obtained as in Example 8. The experiment shows that even in the absence of added acetate, aniline can act as a very good denitrifying agent without causing corrosion. Notice that the influent wastewater contained no acetate. However, small amounts of acetate ion were detected after thermal treatment (~150 ppm). This indicates that acetate was formed during the thermal oxidation of aniline, the only organic component present in the mixture. The slow corrosion rate was evidenced by the very low concentrations of iron, chromium, nickel and molybdenum present in the effluent.

What is claimed is:

1. In a process for the wet oxidation of a waste stream containing carbon and nitrogen contaminants using a nitrate as the denitrifying agent under conditions wherein the carbon form is converted to carbon dioxide and the nitrogen form is converted to nitrogen, an improvement for reducing the corrosiveness of said waste stream contaminated with sulfur or phosphorous containing components, organic or inorganic or both, comprising using a nitrate salt of an aliphatic or aromatic amine as the denitrifying agent.

2. The process of claim 1 wherein aliphatic amine is selected form the group consisting of C1–4 alkyl amines, e.g., methyl amine, ethyl amine, butyl amine; cycloaliphatic amines such as cyclohexane diamine, cyclohexylamine, methylcyclohexyl amine and methylcyclohexyldiamine.

3. The process of claim 2 wherein the pH is maintained within a range of 1.5 to 4.

4. The process of claim 3 wherein the pH is controlled by addition of an alkali metal.

5. The process of claim 3 wherein the aromatic amine includes the nitrate salt of aniline and the toluenediamine nitrate salts represented by the formulas.

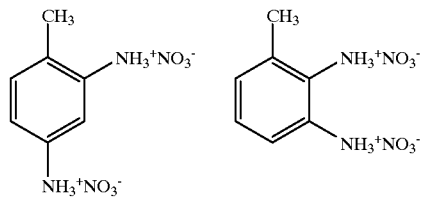

6. The process of claim 5 wherein the waste stream is contaminated with sulfur containing components and alkali metal, ammonium acetate or acetic acid is added to the waste stream.

7. The process of claim 6 wherein the temperature of wet oxidation is from 300 to 400° C.

8. The process of claim 5 wherein the waste stream is a stream contaminated with nitroaromatics.

* * * * *

UNITED STATES PATENT AND TRADEMARK OFFICE
CERTIFICATE OF CORRECTION

PATENT NO. : 6,379,562 B1 Page 1 of 1
DATED : April 30, 2002
INVENTOR(S) : Juan Jesus Burdeniuc It is certified that error appears in the above-identified patent and that said Letters Patent is hereby corrected as shown below:

<u>Title page,</u>
Item [73], Assignee, delete "Atr Products and Chemicals, Inc.," and substitute therefore -- Air Products and Chemicals, Inc., --

Signed and Sealed this

Twenty-fourth Day of September, 2002

Attest:

Attesting Officer

JAMES E. ROGAN
Director of the United States Patent and Trademark Office